May 12, 1942. L. A. POWELL 2,283,125
LOCKING SNAP FASTENER
Filed Jan. 13, 1939
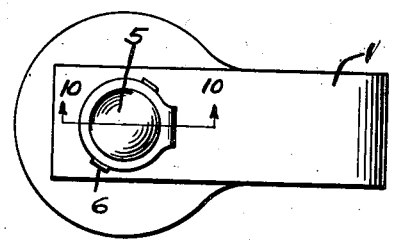
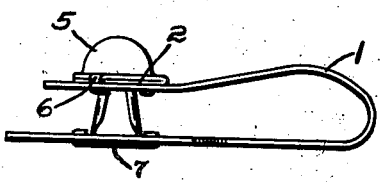
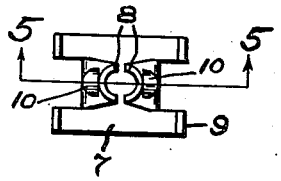
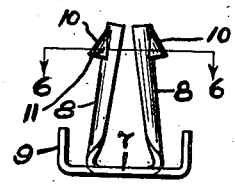
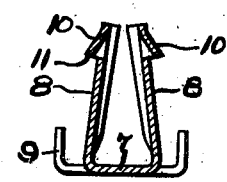
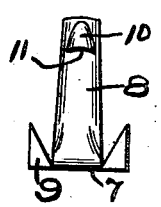
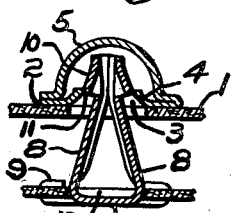
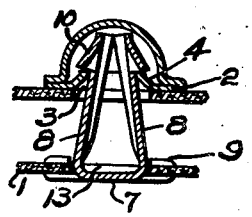
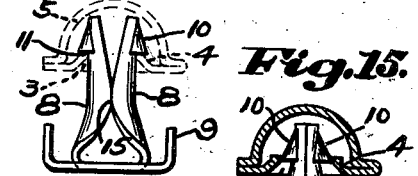
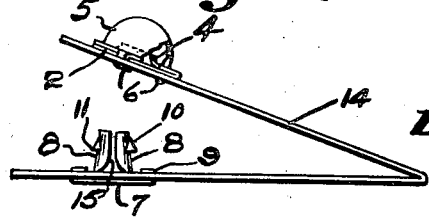
Inventor:
Leonard A. Powell
By Walter J. Ennis
Att'y.

Patented May 12, 1942

2,283,125

UNITED STATES PATENT OFFICE 2,283,125

LOCKING SNAP FASTENER

Leonard A. Powell, Hyde Park, Mass., assignor to United-Carr Fastener Corporation, Cambridge, Mass., a corporation of Massachusetts Application January 13, 1939, Serial No. 250,722

1 Claim. (Cl. 85—5)

My invention aims to provide improvements in snap fastener stud and socket members particularly useful as a tag and the like fastener when it is desirable to lock the stud and socket against separation except by destruction.

In the drawing which illustrates two forms of my invention:

Figure 1 is a plan view of a tag to which my improved fastener members have been attached;

Figure 2 is a side elevation of the tag and fastener shown in Figure 1;

Figure 3 is a top view of a stud member of my improved snap fastener;

Figure 4 is a side elevation of the stud shown in Figure 3;

Figure 5 is a section of the stud taken on the line 5—5 of Figure 3;

Figure 6 is a plan section taken on the line 6—6 of Figure 4;

Figure 7 is an end view of the fastener stud shown in Figure 3;

Figure 8 is a plan view of my improved socket member;

Figure 9 is a side view of the socket shown in Figure 8;

Figure 10 is a section on the line 10—10 of Figure 1 showing the stud just entering the socket;

Figure 11 is a section on the line 10—10 of Figure 1 showing the stud fully compressed as it enters the socket;

Figure 12 is a section taken on the line 10—10 of Figure 1 showing the stud locked in the socket;

Figure 13 is a side view, partly in section, of another tag with a shorter stud the legs of which are slightly different than those of the stud shown in Figures 1, 2 and 3;

Figure 14 is a side view of a stud constructed similarly to that in Figure 13 and the socket being shown in dotted lines; and Figure 15 is a section of the fastener shown in Figure 14, the stud being shown in its fully compressed position.

Referring first to the tag and fastener shown in Figures 1 through 12, inclusive, I have shown a tag construction such as would be used by ski hill and dance hall proprietors to be attached in a buttonhole or the like of a garment on a person paying admission. In this case the shank needs to be long enough to pass through a relatively thick article. The tag 1 has a socket attached to one end and a stud attached to the other end, as shown in Figures 1 and 2.

My improved socket is preferably formed of suitable sheet metal and has a stud-receiving portion 2 provided with a stud-receiving aperture 3 preferably surrounded by a frusto-cone shaped wall 4 to guide the stud into the aperture as shown in Fig. 10. The socket also has a dome-shaped cover portion 5 preferably attached integrally to the portion 2 and superposed above it to cover the end of the stud when entered into the socket. Prongs 6 extend from the edge of the cover portion 5 downwardly past the edge of the stud-receiving portion 2, as shown in Figs. 1 and 10.

The stud is formed of suitable springy sheet metal and has a base 7, a yieldable shank in the form of a pair of legs 8—8 and attaching prongs 9 extending from the base at suitable points and in the same direction from the base as the shank. The legs 8—8 are preferably curved in plan cross-section and converge from the base toward their free ends, as shown in Fig. 4. Adjacent to the free end of each leg 8 I have pressed out, from the leg, a socket-engaging projection 10 which flares outwardly away from the end (Figs. 4 and 5) and presents a sharp shoulder 11 facing the base of the stud. The greatest distance between the outermost edges of the shoulders is preferably slightly more than the diameter of the stud-receiving aperture for the purpose hereinafter described.

While my improved fasteners may be attached in any suitable manner to secure the desired results, I have found that they should be assembled as follows to secure the most tamper-proof arrangement.

The socket is preferably attached to the outside face of one end of the tag 1 over an aperture 12, as shown in Figs. 10, 11 and 12. The prongs 6 self-pierce their way through the tag material and are bent over against the underneath surface of the tag as shown in Fig. 2. Thus the prongs hold the socket in place and also hold the cover portion 5 tightly against the stud-receiving portion so that the socket cannot be tampered with from the exposed side without causing noticeable injury.

To attach the stud I preferably pass the shank through a hole 13 in the tag so that the base 7 lies on the outer face of its portion of the tag (Figs. 2 and 10). The attaching prongs 9 self-pierce their way through the tag material and are bent over as shown in the drawing. Thus the stud cannot be tampered with unless noticeable injury results to either the tag or the fastener. It should be borne in mind that the space between the overlapping portions of the tag is taken up by the material to which it is attached and therefore there is no possibility of the device being removed and reused because it must be destroyed to be removed. Thus, either the tag is torn through or the fastener is so distorted in detaching that one would easily recognize the fact that there had been tampering with the tag. As a matter of fact, the action of the fastener and construction of the stud is such that the chances of successful removal of the stud from the socket, without damage, is apparently impossible. At least I feel that my devices that I have made are entirely commercially useable and will serve a very useful purpose at a reasonably small cost with a maximum of efficiency and durability.

In order to better understand the operation of my fastener I have shown in Figure 10 a section showing a stud attached to a piece of the tag 1 and a socket attached to a piece of the tag 1 with the stud entered into the socket to the point where the ends of the legs 8—8 have just come into contact. It should be noted how the tapering socket-engaging projections 10—10 guide into engagement with the frusto-conical wall 4. As the socket and stud are pressed together the edges of the legs progressively contact, as shown in Fig. 11, until the greatest contraction of the legs occurs as the projections 10—10 pass the upper end of the wall, as clearly shown in Fig. 11. Then as the projections 10—10 snap by the upper edge of the wall 4 the legs expand but preferably the edges at the upper end remain in contact, as shown in Fig. 12. In this position the sharp shoulders 11 positively lock with the socket and are held locked under tension of the legs. Thus the socket and the stud cannot be separated by any axial strain and I have provided a positive lock fastener which is simple in construction and neat in appearance.

In Fig. 13 I have shown a fastener for a tag such as a band tag 14. That is, the tag has a relatively long portion between the fasteners to encircle an article. In this case the shank of the stud is made short so that the overlapping ends of the tag will come together to prevent tampering with the fastener by any means which would be available providing the shank is made too long.

The fastener shown in Figs. 14 and 15 is the same as shown in Figs. 1 through 12, inclusive, except that the legs of the stud are shaped differently at their edges. In this case the legs are shaped to abut at some point between their ends upon initial contraction, as shown in Fig. 14. As the stud is forced through the socket (Fig. 15) the edges 15 of the legs progressively contact from their points of original contact toward the free ends of the legs, thus setting up a return yielding action to hold the legs under tension with a resulting positive locking after the projections 10—10 are snapped through the aperture 3.

While I have illustrated and described preferred embodiments of my invention, I do not wish to be limited thereto, because the scope of my invention is best defined by the following claim.

I claim:

A stud member for snap fastener engagement with a cooperating socket member through an aperture thereof, said stud member having a base, a yieldable shank extending from said base in the form of a pair of legs arched in cross-section for passage into the aperture of the socket member and socket-engaging projections on said shank diverging relative to each other in a direction toward said base and presenting shoulders for locking engagement with said socket, and the edges of said arched portions of said legs arranged to abut during passage through the aperture in the socket and remaining in abutment to assist in positive locking of the stud in the socket.

LEONARD A. POWELL.